United States Patent Office 3,726,810
Patented Apr. 10, 1973

3,726,810
RHENIUM-ALUMINA CATALYST AND METHOD OF ACTIVATING SAME WITH ANHYDROUS TREATING AGENTS
John W. Myers, Bartlesville, Okla., assignor to Phillips Petroleum Company
No Drawing. Filed Dec. 24, 1970, Ser. No. 101,419
Int. Cl. B01j *11/78*
U.S. Cl. 252—441
9 Claims

ABSTRACT OF THE DISCLOSURE

An activated rhenium-alumina catalyst is prepared by heating rhenium-containing alumina at 400–1500° F. in a dry ambient and treating it with anhydrous treating agents, i.e. $Cl_2$, HCl, HBr, $Br_2$ and Cl and Br derivatives of methane, at 400–1500° F. The activated catalyst finds utility in the isomerization of paraffins and naphthenes.

---

This invention relates to a process for activating rhenium-containing alumina catalysts. In another aspect, this invention relates to an activated rhenium-containing alumina catalyst composition. In yet another aspect, this invention relates to an improved low temperature process for the catalytic conversion of hydrocarbon feedstreams.

Modern motor fuels requirements have increasingly demanded high octane ratings. In fact, present day automotive fuels are almost comparable in octane number to aviation gasoline of the past. As a consequence of this rise in octane number, many new processes have been introduced in refineries for the production of such high grade motor fuels and include, for example, alkylation, catalytic conversion of hydrocarbons, catalytic cracking and the like. In connection with such processes, particularly alkylation, a source of isoparaffin is necessary. Thus, it has been necessary to provide new processes for the production of isoparaffins, since natural sources of these materials are not nearly sufficient to supply present day needs. The most widely used method of the preparation of isoparaffins comprises isomerization of normal paraffins. Hydrocracking of heavier hydrocarbons to produce lighter hydrocarbons is also practiced by the petroleum industry.

The catalytic conversion of hydrocarbons over platinum-on-alumina, promoted with noble metals has been practiced. Platinum catalysts, for example, are highly selective toward the production of high octane aromatics and highly active for the several reactions that occur during hydrocarbon conversion processing. However, platinum catalysts are also very expensive because of the high cost of platinum and will probably become even more expensive as a result of restricted availability of the metal. These economic factors have led the petroleum industry to seek less expensive substitutes for platinum and to investigate catalytic systems using metal other than platinum.

An object of this invention is to provide a process for the formation of active rhenium-containing alumina catalysts which will provide suitable hydrocarbon conversion activities at relative low temperatures. Another object of this invention is to provide a low-cost, long-life catalyst for the catalytic conversion of hydrocarbons. Still another object of this invention is to provide an improved catalytic process for hydrocarbon conversion, for example, the low temperature isomerization of normal paraffins and naphthenes.

Other aspects and objects of this invention will hereinafter appear.

In accordance with this invention, rhenium-containing alumina catalysts are rendered active by treating with anhydrous treating agents selected from the group consisting of $Cl_2$, HCl, $Br_2$, HBr, mono-, di-, tri- and tetrachloromethane, and mono-, di-, tri- and tetrabromomethane. The activation process of the present invention is carried out by heating the rhenium-containing alumina catalyst in the presence of the above treating agents at a temperature of from about 400° to about 1500° F., for a period of at least 0.1 to 100 hours in a dry ambient. The treating agent may be used alone, or it may be carried in a stream of an essentially inert gas such as nitrogen, hydrogen, methane or ethane, wherein the halogen comprises from 1 to 99 percent by volume of the activating stream. The activating gas pressure (in the activation zone) is not critical, but is usually about atmospheric or a convenient higher pressure.

In further accord with the invention, the rhenium-containing aluminum catalyst activated by the above-described process can be used for the catalytic conversion of hydrocarbon feedstreams. Paraffins or naphthenes, for example, are isomerized by contact with the catalyst of the present invention at temperatures in the range of about 100 to 600° F. The contact can be carried out at any convenient pressure within the range of from 0 to 2000 p.s.i.g. and, preferably, in the presence of some free hydrogen. The catalyst activity can be maintained at a high level during use in the isomerization process by including small amounts of a halogen-containing compound in the feed.

The catalysts of the present invention can be prepared using any conventional catalytic grade of alumina generally having a surface area of at least 1 m.$^2$/g. Eta-aluminas and gamma-aluminas prepared by precipitation techniques are generally preferred. The alumina can contain from about 0.1 to about 5, preferably from about 0.1 to about 3, weight percent rhenium. The rhenium is incorporated into the alumina using any conventional catalyst preparation technique. Preferably, the alumina is impregnated by a suitable rhenium-containing solution, for example, solutions of perrhenic acid or solutions of ammonium perrhenates. In some instances, copromoting the rhenium-alumina composite with minor amounts of platinum group metals such as platinum, ruthenium, rhodium, palladium, iridium, and osmium can be beneficial. Following the impregnation, the rhenium-impregnated alumina can be washed to remove any non-volatile materials, dried, then calcined, in dry flowing air or a hydrogen stream, at 400–1500° F. for 0.1–100 hours. The calcination temperature is preferably at least 600° F.

Following this calcination, the composite is then, preferably, subjected to a hydrogen treatment at elevated temperatures. Thus, the composite can be heated at 400–1500° F., preferably 600–1500° F., for 0.1–100 hours in dry flowing hydrogen. In some instances, the hydrogen treatment can take the place of the above-described calcination in air.

The above-described rhenium-containing composition which has been calcined and subjected to an optional reduction in hydrogen treatment is then contacted with the aforementioned anhydrous treating agents while at a temperature of 400–1500° F., preferably 1050–1400° F., for a period of at least 10 minutes and up to 100 hours or more, preferably 0.5–6 hours. The treating gas pressure is not critical, but is usually about atmospheric or at some convenient higher pressure. Treatment of the rhenium-containing alumina composition using aqueous solutions, for example aqueous solutions of hydrochloric or hydrobromic acid, does not produce the active catalyst of the present invention.

For best results, it is important that, at the conclusion of the treatment period, the temperature of the catalyst be reduced to a temperature in the operating range, for example 300° F., while still in contact with the treating gas. Once in the operating temperature range, the active catalyst can be flushed, if desired, with an inert gas such as nitrogen, or it can be put directly in contact with the hydrocarbon feedstream.

The catalyst is capable of long life, particularly when some hydrogen is present in the reaction zone. However, when the catalyst becomes deactivated after long use, it can be regenerated by repeating the sequence of steps used in the initial catalyst preparation, namely, the calcination in an oxygen-containing gas, the hydrogen treatment, if desired, and contacting the catalyst with a bromide and/or chloride treating agent.

Suitable feedstocks, for example paraffins or naphthenes, are isomerized by contact with the catalyst of the present invention at temperatures in the range of 100–600° F., preferably 100–500° F. The contact can be carried out at any convenient pressure within the range of 0–2000 p.s.i.g. Preferably, the isomerization is carried out in the presence of some free hydrogen and the molar ratio of hydrogen to hydrocarbon will generally be in the range of 0.25–10.0. The feed rate for the process will generally be in the range of 10–5000 GHSV.

The activity of the catalyst can be maintained at a high level during use in the isomerization process by including 0.001–1 weight percent of a chlorine-containing compound in the feed. Such chlorine-containing compounds can be chlorinated hydrocarbons such as carbon tetrachloride, chloroform, ethyl chloride, isopropyl chloride, and the like, and mixtures thereof. This is not a substitute for the activation process of the present invention, but aids in maintaining, over longer process periods, the high level of catalyst activity produced by the present invention.

The isomerization process of the present invention is preferably carried out continuously using any suitable contacting technique such as a fixed catalyst bed or a fluidized catalyst bed. After leaving the reaction zone, the reaction effluent can be conventionally separated and the desired products recovered. Hydrogen, if used, as well as any unconverted feeds, can be recycled to the reaction zone.

This catalyst can be used according to the process of the present invention to isomerize paraffins and naphthenes. Paraffins such as straight-chain paraffins having from about 4 to about 10 carbon atoms per molecule and naphthenes having from about 6 to about 10 carbon atoms per molecule are particularly suitable feedstocks. Some examples of such feeds are: n-butane, n-pentane, n-heptane, methylcyclopentane, dimethylcyclopentane, cyclohexane, butylcyclohexane, and the like, and mixtures thereof. Mixtures of paraffins and naphthenes such as are obtained from distillation of straight run or natural gasolines can be used.

The halogen-activated rhenium-alumina catalyst of the present invention can also be advantageously utilized in other hydrocarbon conversions such as hydrocracking, alkylation, disproportionation, polymerization, hydrogen-transfer, dealkylation, and other reactions requiring acidic catalysts.

The following example is submitted for the purpose of illustration only and is not to be construed as a limitation upon the scope of the invention.

EXAMPLE

A 45.0 g. quantity of 14–20 mesh catalytic eta-alumina was dried 2 hours in flowing air at 800° F. The alumina was then impregnated with a perrhenic acid solution. The solution was prepared by diluting 4.35 ml. of a perrhenic acid solution, which contained 0.052 g. Re/ml., to 31.5 ml. with deionized water.

The above mixture was then dried at 230° F., then a 20 g. portion was charged into a tubular fixed bed reactor and heated in a stream of dry hydrogen at 1200° F. for about 15 hours. The catalyst was then further treated for 1.5 hours in flowing hydrogen chloride gas at 1200° F. The catalyst was then cooled to 400° F. while still in the presence of flowing hydrogen chloride gas. It was then purged with a stream of dry nitrogen gas.

While still in the fixed bed reactor, the above-activated catalyst was then contacted with a flow of n-butane at 153° F., 0 p.s.i.g., and a gaseous hourly space velocity of 47. The essential conditions and the results of this run are shown in Table I below. For purposes of comparison, a similarly prepared, but rhenium-free, alumina catalyst was also tested with the n-butane feed stream. The results of this test are also shown in Table I below.

TABLE I.—ISOMERIZATION OF n-BUTANE

| Run | A | B |
|---|---|---|
| Catalyst [1] | 0.5 Re/Al$_2$O$_3$ | Al$_2$O$_3$ |
| Isomerization conditions: | | |
| Temperature, °F | 153 | 151 |
| Pressure, p.s.i.g | 0 | 0 |
| GHSV | 47 | 47 |
| n-Butane conversion, percent | 33.4 | 30.4 |
| Selectivity to isobutane, percent | 98.5 | 99.0 |

[1] Both catalysts activated in anhydrous HCl at 1,200° F.

Without chloride-activation, rhenium-alumina will give substantially zero conversion of butane at these experimental conditions.

The data in the table above show that halogen-treated Re/Al$_2$O$_3$ catalyst is very active and selective for the isomerization of n-butane. The data also show that the invention catalyst is more active than the rhenium-free alumina catalyst under comparable conditions.

Certain modifications of the invention will become apparent to those skilled in the art and the illustrative details disclosed are not to be construed as imposing unnecessary limitations on the invention.

What I claim is:

1. A process for the formation of an active rhenium-containing alumina catalyst, said catalyst consisting essentially of alumina and from 0.01 to 5 weight percent of rhenium, comprising heating said rhenium-containing alumina at a temperature in the range of 400 to 1500° F. in a dry ambient, and thereafter treating the heated rhenium-containing alumina with at least one anhydrous treating agent selected from the group consisting of Cl$_2$, HCl, HBr, Br$_2$, and the Cl and Br derivatives of methane at a temperature of 400 to 1500° F., for at least 10 minutes.

2. A process according to claim 1 wherein heating of said rhenium-containing alumina is carried out in an anhydrous gas selected from the group consisting of hydrogen and air for 0.1 to 100 hours.

3. A process according to claim 2 wherein said heating is carried out in the presence of hydrogen.

4. A process according to claim 1 wherein said anhydrous treating agent contains chlorine.

5. A process according to claim 4 wherein said anhydrous treating agent is hydrogen chloride.

6. The process of claim 1 wherein said rhenium-containing alumina is contacted with dry flowing hydrogen for 0.1 to 100 hours at a temperature of from about 400° to 1500° F.

7. A process according to claim 1 wherein said treating agent is present in an amount of from 1 to 99 percent of a carrier gas which is essentially inert in the treating process.

8. The active rhenium-containing alumina catalyst prepared by the process of claim 1.

9. The active rhenium-containing alumina catalyst prepared by the process of claim 5.

References Cited

UNITED STATES PATENTS

| | | | |
|---|---|---|---|
| 3,438,888 | 4/1969 | Spurlock | 208—139 |
| 3,537,980 | 11/1970 | Kluksdahl | 208—139 |
| 3,557,022 | 1/1971 | Rausch | 260—683.68 |

FOREIGN PATENTS

| | | | |
|---|---|---|---|
| 1,164,687 | 9/1969 | England | 260—683 D |

DELBERT E. GANTZ, Primary Examiner

G. J. CRASANAKIS, Assistant Examiner

U.S. Cl. X.R.

252—463; 260—683.68